(12) United States Patent
Yamamura et al.

(10) Patent No.: US 10,139,821 B2
(45) Date of Patent: Nov. 27, 2018

(54) CONTROL APPARATUS FOR AUTONOMOUSLY NAVIGATING UTILITY VEHICLE

(71) Applicant: Honda Motor Co., Ltd., Tokyo (JP)

(72) Inventors: Makoto Yamamura, Wako (JP); Toshiaki Kawakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/080,164

(22) Filed: Mar. 24, 2016

(65) Prior Publication Data

US 2016/0282868 A1    Sep. 29, 2016

(30) Foreign Application Priority Data

Mar. 27, 2015  (JP) .................................. 2015-067217

(51) Int. Cl.
*G05D 1/00* (2006.01)
*G05D 1/02* (2006.01)
*A01D 34/00* (2006.01)

(52) U.S. Cl.
CPC ......... *G05D 1/0088* (2013.01); *G05D 1/0265* (2013.01); *G05D 1/0274* (2013.01);
(Continued)

(58) Field of Classification Search
None
See application file for complete search history.

(56) References Cited

U.S. PATENT DOCUMENTS 6,255,793 B1 *  7/2001  Peless ................. A01D 34/008
                                                         180/168
8,744,626 B2 *  6/2014  Johnson ............. A01D 34/008
                                                         700/250
(Continued)

FOREIGN PATENT DOCUMENTS

| EP | 2626762 A2 | 8/2013 |
| EP | 2703925 A1 | 3/2014 |
| WO | 2012044220 A1 | 4/2012 |

OTHER PUBLICATIONS

Robert Oshana and Mark Kraeling, Software Engineering for Embedded Systems: Methods, Practical Techniques, and Applications , 2013 (Year: 2013).*

*Primary Examiner* — Tamara L Weber
(74) *Attorney, Agent, or Firm* — Duft & Bornsen, PC (57) ABSTRACT

An apparatus for controlling operation of an autonomously navigating utility vehicle equipped with a prime mover to travel about a working area delineated by a boundary wire laid thereat and divided into a first area and a second area connected by a third area that is narrower than the first and second areas, there are provided with a first travel controlling unit that controls operation of the prime mover to make the vehicle travel along the boundary wire based on a detected magnetic field, a third area identifying unit that identifies a location of the third area in the working area based on a detected position of the vehicle when the vehicle is controlled to travel by the first travel controlling unit, and a second travel controlling unit that controls operation of the prime mover to make the vehicle travel forward toward an entrance of the third area whose location is identified by the third area identifying unit based on the position of the vehicle detected from the output of the position sensor.

6 Claims, 8 Drawing Sheets

(52) U.S. Cl.
CPC ......... *G05D 1/0278* (2013.01); *A01D 34/008* (2013.01); *G05D 2201/0208* (2013.01)

(56) References Cited

U.S. PATENT DOCUMENTS

| | | | |
|---|---|---|---|
| 9,072,219 B2* | 7/2015 | Da Rocha | A01D 34/008 |
| 9,516,806 B2* | 12/2016 | Yamauchi | G05D 1/0236 |
| 2008/0039974 A1* | 2/2008 | Sandin | G05D 1/028 |
| | | | 700/258 |
| 2009/0149990 A1 | 6/2009 | Myeong et al. | |
| 2012/0029753 A1* | 2/2012 | Johnson | A01D 34/008 |
| | | | 701/23 |
| 2012/0179321 A1* | 7/2012 | Biber | G05D 1/0259 |
| | | | 701/25 |
| 2013/0184924 A1* | 7/2013 | Jagenstedt | A01D 34/008 |
| | | | 701/23 |
| 2013/0211648 A1 | 8/2013 | Yamamura et al. | |
| 2014/0058611 A1* | 2/2014 | Borinato | G05D 1/0265 |
| | | | 701/23 |
| 2016/0165795 A1* | 6/2016 | Balutis | G05D 1/0265 |
| | | | 701/25 |

\* cited by examiner

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067217 filed on Mar. 27, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other tasks in a working area.

Description of Related Art

Control apparatuses are known that regulate travel activity of an autonomously navigating utility vehicle to perform a task while autonomously traveling in a working area delineated by a boundary wire, as taught by International Publication 2012/044220, for example. The control apparatus described in this reference is configured to have multiple magnetic field detectors on the utility vehicle and to enable the utility vehicle to travel in a narrow area between a pair of facing boundary wire segments utilizing difference between magnetic field strengths detected from outputs of the multiple magnetic field detectors.

In this regard, when, for example, the working area are constituted by a first area and a second area that are connected via a third (narrow) area and a utility vehicle situated in the first area is operated to perform a task in the second area, it is preferable from the viewpoint of working efficiency for the utility vehicle to move quickly from the first area to the second. However, the aforesaid reference simply describes only a technique of third (narrow) area driving based on the magnetic field strengths detected from the outputs of magnetic field detectors, and the technique of the reference cannot easily quickly move the utility vehicle from the first area to the second area.

SUMMARY OF THE INVENTION

According to an aspect of the present invention, there is provided an apparatus for controlling operation of an autonomously navigating utility vehicle equipped with a prime mover to travel about a working area delineated by a boundary wire laid thereat, the working area being divided into at least a first area and a second area connected by a third area that is narrower than the first and second areas, comprising: a magnetic sensor installed on the autonomously navigating utility vehicle to produce an output indicating a magnetic field generated by electric current passing through the boundary wire; a position sensor that produces an output indicating a position of the autonomously navigating utility vehicle; and an electronic control unit having a CPU and a memory, wherein the CPU is configured to function as a first travel controlling unit that controls operation of the prime mover to make the autonomously navigating utility vehicle travel along the boundary wire in trace mode to determine the working area based on the magnetic field detected from the output of the magnetic sensor; a map generating unit that generates a map of the working area by determining the position of the autonomously navigating utility vehicle on a map comprised of an array of multiple cells detected from the output of the position sensor when the autonomously navigating utility vehicle is controlled to travel by the first travel controlling unit; and a target position setting unit that sets a target position of the autonomously navigating utility vehicle in the second area; a third area identifying unit that identifies a location of the third area in the working area based on the position of the autonomously navigating utility vehicle on the map generated by the map generating unit detected from the output of the position sensor when the autonomously navigating utility vehicle is controlled to travel by the first travel controlling unit; and a second travel controlling unit that controls operation of the prime mover in work mode to make the autonomously navigating utility vehicle travel forward toward an entrance of the third area whose location is identified by the third area identifying unit based on the position of the autonomously navigating utility vehicle detected from the output of the position sensor.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
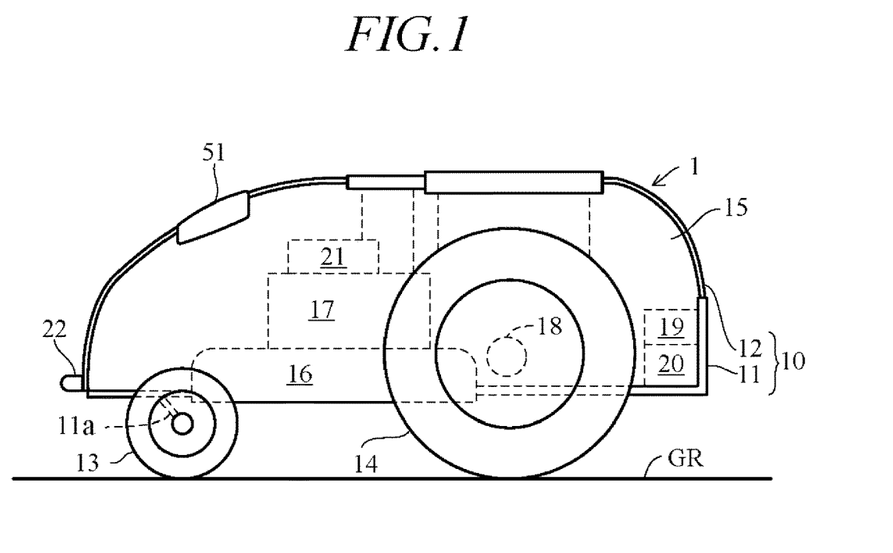
FIG. 1 is a side view schematically illustrating configuration of an autonomously navigating utility vehicle according to an embodiment of this invention.

An embodiment of the present invention is explained with reference to FIGS. 1 to 10 in the following. FIG. 1 is a side view schematically illustrating the configuration of an autonomously navigating utility vehicle according to the embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
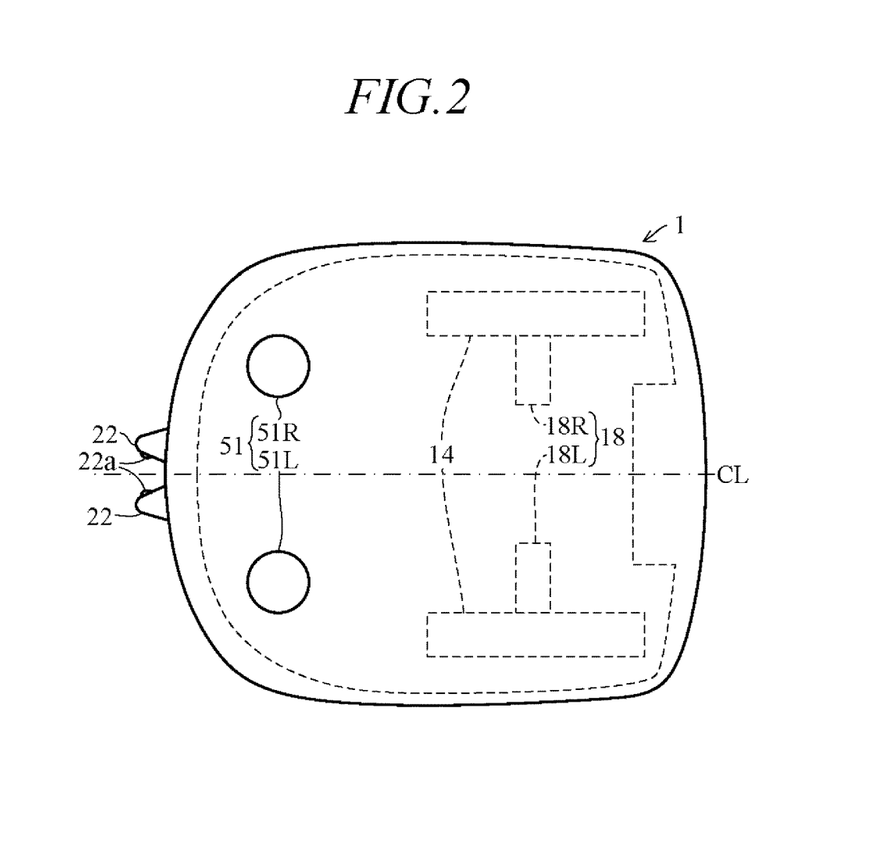
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front end of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19 and a battery 20 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 5). The battery 20 is connected through wires to the work motor 17 and the travel motors 18, and the work motor 17 and the travel motors 18 are driven by power supplied from the battery 20 through drivers.

Figure 3:
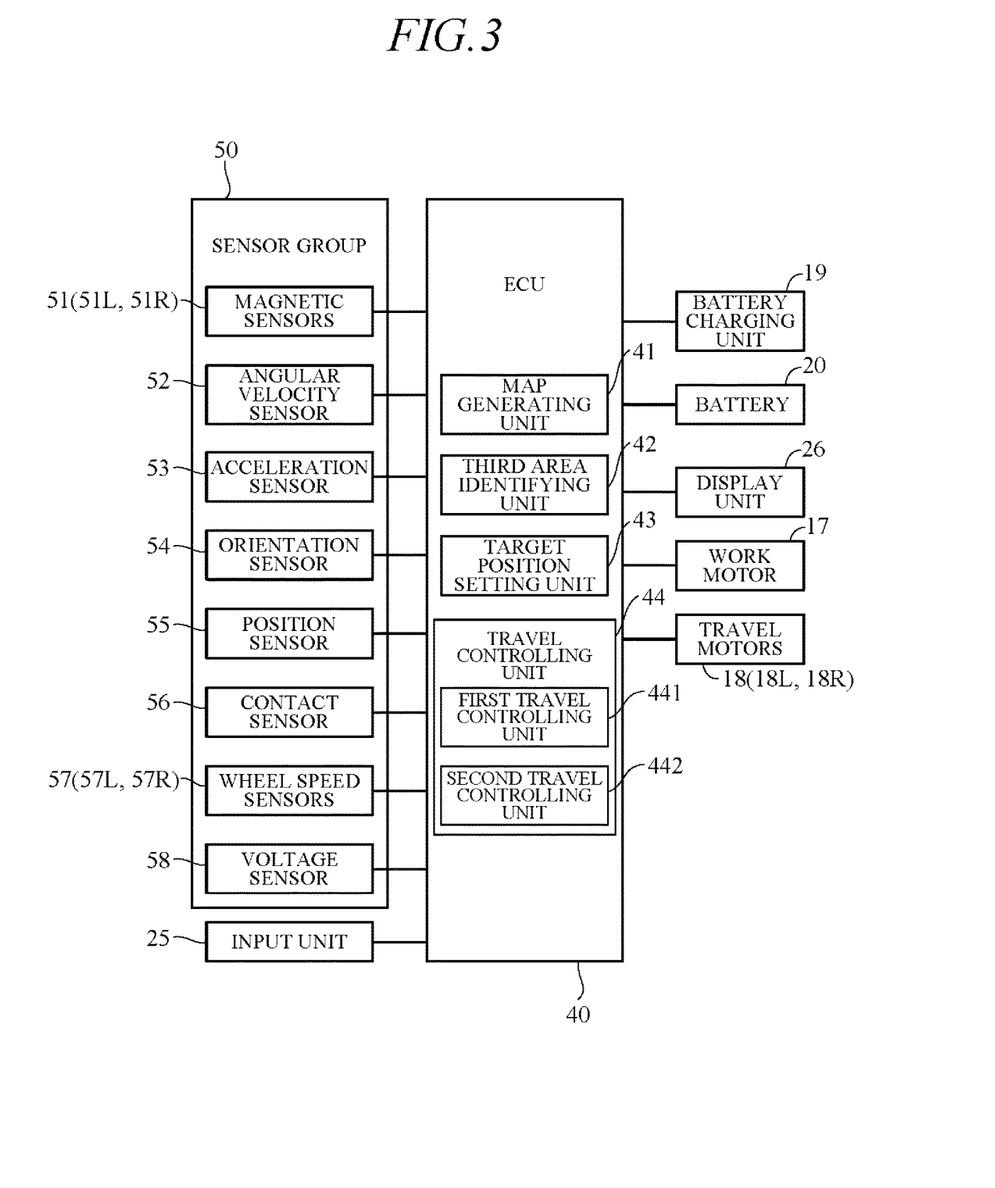
FIG. 3 is a block diagram showing the configuration of the control apparatus of the vehicle according to the present embodiment including an ECU.

FIG. 3 is a block diagram showing the configuration of the control apparatus of the vehicle 1 according to the present embodiment. As shown in FIG. 3, an Electronic Control Unit (ECU) 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, input unit 25, display unit 26, work motor 17 and travels motors 18 (18R, 18L). The group of sensors 50 includes a pair of magnetic sensors 51 (51R, 51L), an angular velocity sensor (turning angle sensor) 52, an acceleration sensor 53, an orientation sensor 54, a position sensor 55, a contact sensor 56, a pair of wheel speed sensors 57 (57R, 57L), and a voltage sensor 58.

The magnetic sensors 51, i.e., 51R and 51L are installed laterally spaced apart on the front end of the vehicle 1. More specifically, as shown in FIG. 2, the magnetic sensors 51R and 51L are installed laterally symmetrically with respect to a center line CL running in the straight forward direction along the widthwise center of the vehicle 1. The magnetic sensors 51 produces an output indicating magnitude of magnetic field (more precisely magnetic field strength or intensity) H.

The angular velocity sensor 52 produces an output indicating angular velocity (yaw rate) occurring around a height direction (z-axis) of the vehicle 1, from which the turning angle θ of the vehicle 1 around the z-axis can be calculated.

The acceleration sensor 53 produces an output indicating acceleration acting on the vehicle 1 in the directions of three orthogonal axes (x-axis, y-axis, and z-axis).

The orientation sensor 54 comprises a geomagnetic sensor of 2-axis or 3-axis structure that produces an output indicating geomagnetism, from which an orientation of the vehicle 1 relative to a reference orientation (e.g., north) can be detected.

The position sensor 55 is constituted as a GPS sensor and produces an output indicating a position (self-position) of the vehicle 1 in longitude and latitude by receiving radio waves transmitted from GPS satellites. The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The input unit 25 has various switches provided to be manipulatable by the operator. The switches includes a main switch for inputting various commands, inter alia, start of vehicle 1 operation, an emergency stop switch for stopping the vehicle 1 in an emergency and devices such as numeric keypad, cursor key, switches, etc., also provided to be manipulatable by the operator.

The display unit 26 has a display that shows various information to be supplied to the operator, so that the operator can input commands through the devices of the input unit 25 based on the information shown at the display unit 26. The input unit 25 and display unit 26 may be constituted by a touch panel.

Figure 4:
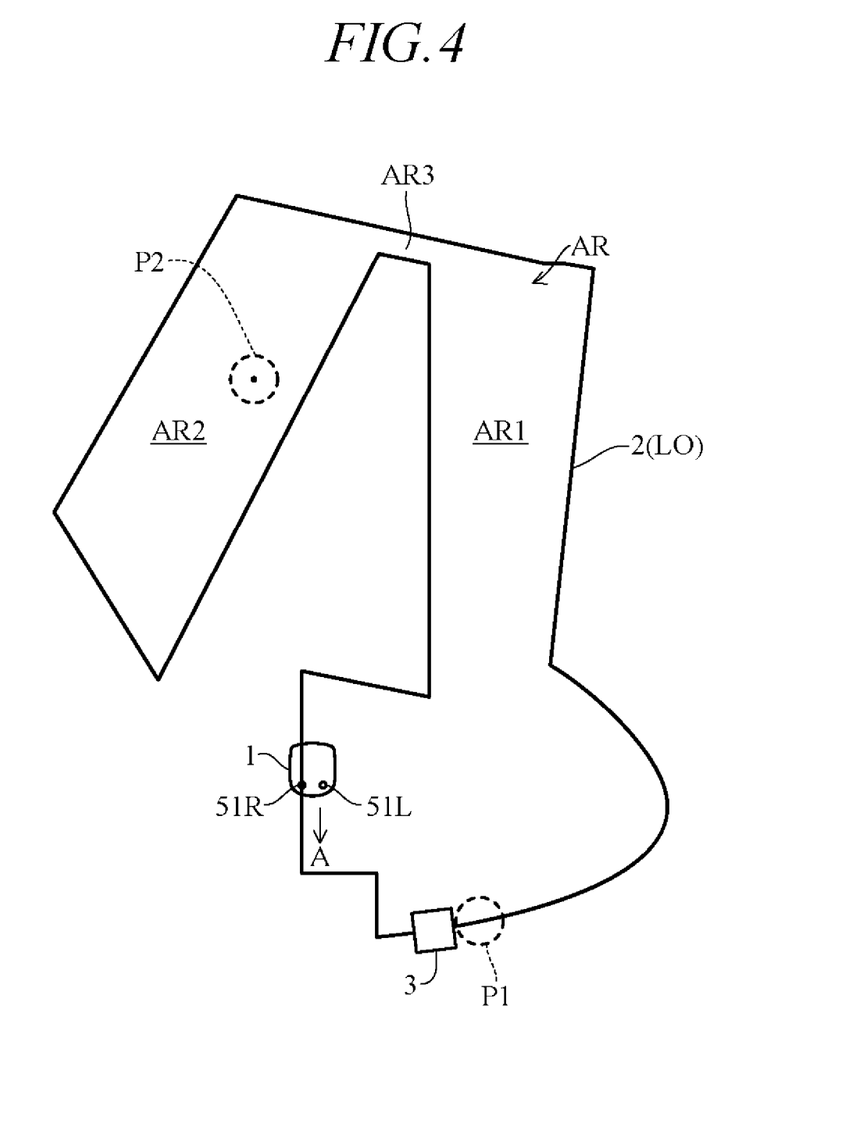
FIG. 4 is a diagram showing an example of a working area to be serviced by the utility vehicle of FIG. 1.

The vehicle 1 configured as described above performs a task while autonomously navigating within a predefined working area. FIG. 4 is a diagram showing an example of a working area AR. The working area AR is, for example, delineated by a boundary wire 2 that constitutes a boundary line (L0) and is laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

FIG. 4 is a diagram showing an example of the working area AR to be serviced by the vehicle 1. As shown in FIG. 4, the working area AR includes a first area AR1 and a second area AR2. The first area AR1 and second area AR2 are connected by a third area (narrow passage) AR3 so that the vehicle 1 can goes and return to the first and second areas AR1 and AR2 through the third area AR3. The charging station 3 is located at the first area AR1. Here, the third area AR3 means an area where the distance (area width) L between mutually facing boundary wires 2 is equal to or less than a predetermined value. Specifically, the distance L is equal to or greater than the width of the vehicle 1 and is equal to or smaller than 2 m. Thus, the third area AR3 is narrower than the first and second areas AR1 and AR2.

Figure 5:
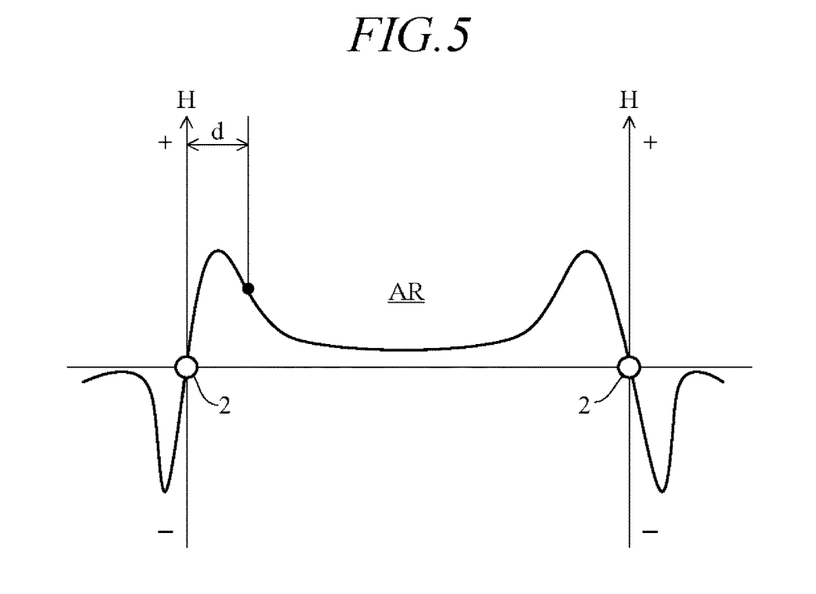
FIG. 5 is a diagram showing a relationship between distance from the boundary wire and magnetic field strength detected by magnetic sensors of FIG. 3.

FIG. 5 is a diagram showing a relationship between distance d from the boundary wire 2 and magnetic field strength H. As indicated in FIG. 5, magnetic field strength H varies with distance d from the boundary wire 2. Specifically, magnetic field strength H is 0 above the boundary wire 2, positive inside the working area AR, and negative outside the same. When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when residual voltage of the battery 20 detected by the voltage sensor 58 falls to or below a predetermined value and the battery 20 requires charging. In trace mode, the vehicle 1 is driven along the boundary wire 2. Trace mode is executed before work mode to ascertain the working area AR. Once the working area has been ascertained, trace mode need not be executed at every work mode.

As shown in FIG. 4, operation of the travel motors 18 is controlled by control commands sent from the ECU 40 to make the vehicle 1 circuit along the boundary wire 2 with one or the other of the pair of magnetic sensors 51R and 51L (e.g., magnetic sensor 51L) positioned inside the boundary wire 2 in trace mode and so that the other magnetic sensor (e.g., 51R) moves above the boundary wire 2 in the direction of arrow A. Specifically, the ECU 40 monitors the output of the magnetic sensor 51R and controls operation of the travel motors 18L and 18R so that magnetic field strength H detected by the magnetic sensor 51R stays at 0.

For example, when magnetic field strength H detected from the output of the magnetic sensor 51R becomes positive, the vehicle 1 is turned rightward by decelerating right travel motor 18R and accelerating left travel motor 18L. On the other hand, when magnetic field strength H detected from the output of the magnetic sensor 51R becomes negative, the vehicle 1 is turned leftward by accelerating the right travel motor 18R and decelerating the left travel motor 18L. As a result, the magnetic sensor 51R is brought near the boundary wire 2 and magnetic field strength H detected from the output of the right magnetic sensor 51R is maintained at 0.

Trace mode is started from a state in which the charging terminals 22 of the vehicle 1 are connected to connection terminals of the charging station 3 and ends when the charging terminals 22 is again connected to the connection terminals after the vehicle 1 makes a circuit along the boundary wire 2. Although the direction A of the circuit is counterclockwise, it may be clockwise. Position of the vehicle 1 from start to finish of trace mode travel is detected from the output of the position sensor 55. Based on the output from the position sensor 55, the ECU 40 identifies working area AR boundary line (L0 in FIG. 7) position coordinates with respect to the charging station 3 as a reference (origin).

Aside from the above, although the vehicle 1 is driven to work thoroughly throughout the first and second areas AR1 and AR2 in work mode, the operator may sometimes want the vehicle 1 to service preferentially in the first area AR1 or the second area AR2 only. In that case, if the vehicle 1 is at the different side of the first and second areas AR1 and AR2, the vehicle 1 must be driven to the other through the third area AR3. For example, as shown in FIG. 4, when the vehicle 1 is at position P1 in the first area AR1, but the operator wants the vehicle 1 to service at position P2 in the second area AR2, the vehicle 1 must travel from the first area AR1 to the second area AR2 through the third area AR3.

At this time, the vehicle 1 can surely be moved to the second area AR2 by driving (trace-driving) the vehicle 1 along the boundary wire 2 in the same way as in trace mode. However, working efficiency is low in this case because work cannot be quickly performed at the target position P2 owing to the long path to the second area AR2. Therefore, the present embodiment is configured as set out below in order to realize efficient travel from one area (first area AR1) through the third area AR3 to another area (second area AR2).

As shown in FIG. 3, the ECU 40 has as functional constituents a map generating unit 41, a third area identifying unit 42, a target position setting unit 43, and a travel controlling unit 44. The travel controlling unit 44 comprises a first travel controlling unit 441 and a second travel controlling unit 442.

The map generating unit 41 generates a map of the working area AR (working area map MP) based on the outputs of the position sensor 55 when the vehicle 1 is driven in trace mode. The working area map MP is configured as a bitmap comprised of an array of the multiple cells. Travel by trace mode is required only once after laying the boundary wire 2.

Figure 6:
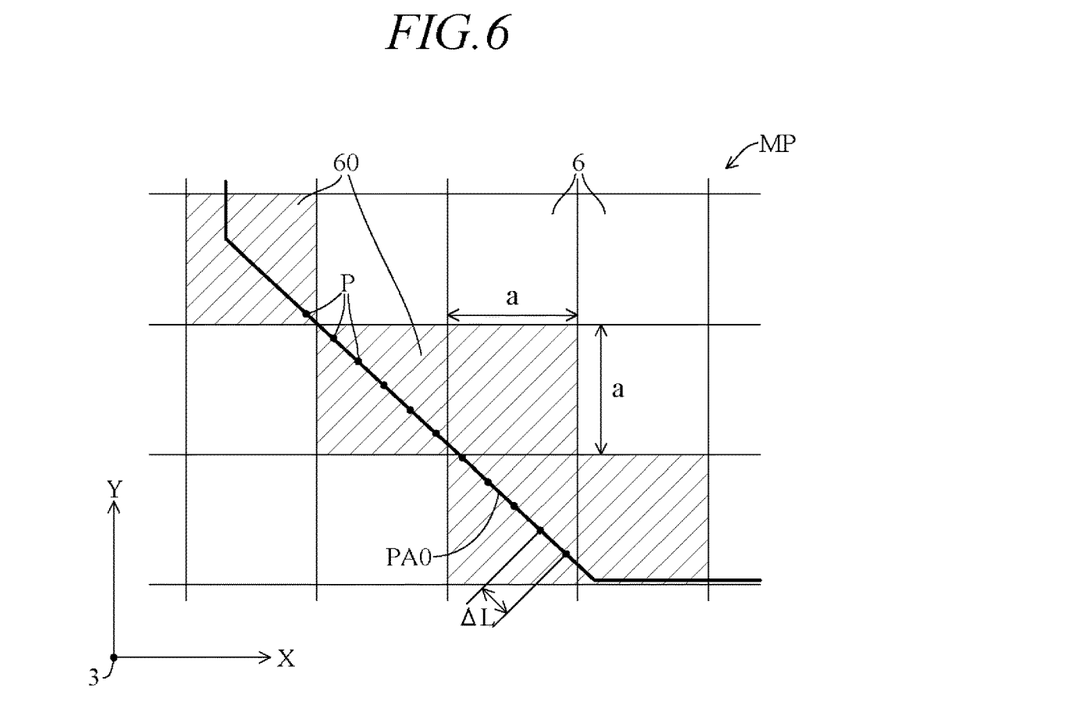
FIG. 6 is a diagram showing an enlarged view of a portion of a working area map to be generated by a map generating unit of FIG. 3.

FIG. 6 is a diagram showing an enlarged view of a portion of the working area map MP. In FIG. 6, the working area map MP is configured by arraying square cells 6 of predetermined side length (e.g., 200 mm) in a grid pattern within a horizontal plane including an X axis and a Y axis (XY plane). Each of the cells 6 includes position data relative to a predetermined position (origin, e.g., the charging station 3). Size of the cells 6 can be varied as appropriate and can, for example, be defined to coincide with working width of the work unit 16 (maximum outer diameter of blade).

The map generating unit 41 identifies cells 6 on the working area map MP passed over by the vehicle 1 in trace mode and memorizes them in a memorizing unit (memory) of the ECU 40. Specifically, it calculate a travel locus PA0 of the vehicle 1 based on position data acquired from the output of the position sensor 55 during trace-driving and identifies/memorizes the cells 60 (hatched portion) included in the travel locus PA0. Among of cells 6, the cells 60 identified in this manner are cells on the boundary line L0 of the working area AR so that the cells 60 are called boundary cells in the following.

Thus, the map generating unit 41 generates the working area map MP by determining the position of the vehicle 1 on the map comprised of an array of multiple cells 6 detected from the output of the position sensor 55 when the vehicle 1 is controlled to travel by the first travel controlling unit 441, more specifically by memorizing the position data of each of the boundary cells 60 over which the vehicle 1 passes when the vehicle 1 is controlled to travel by the first travel controlling unit 441.

Figure 7:
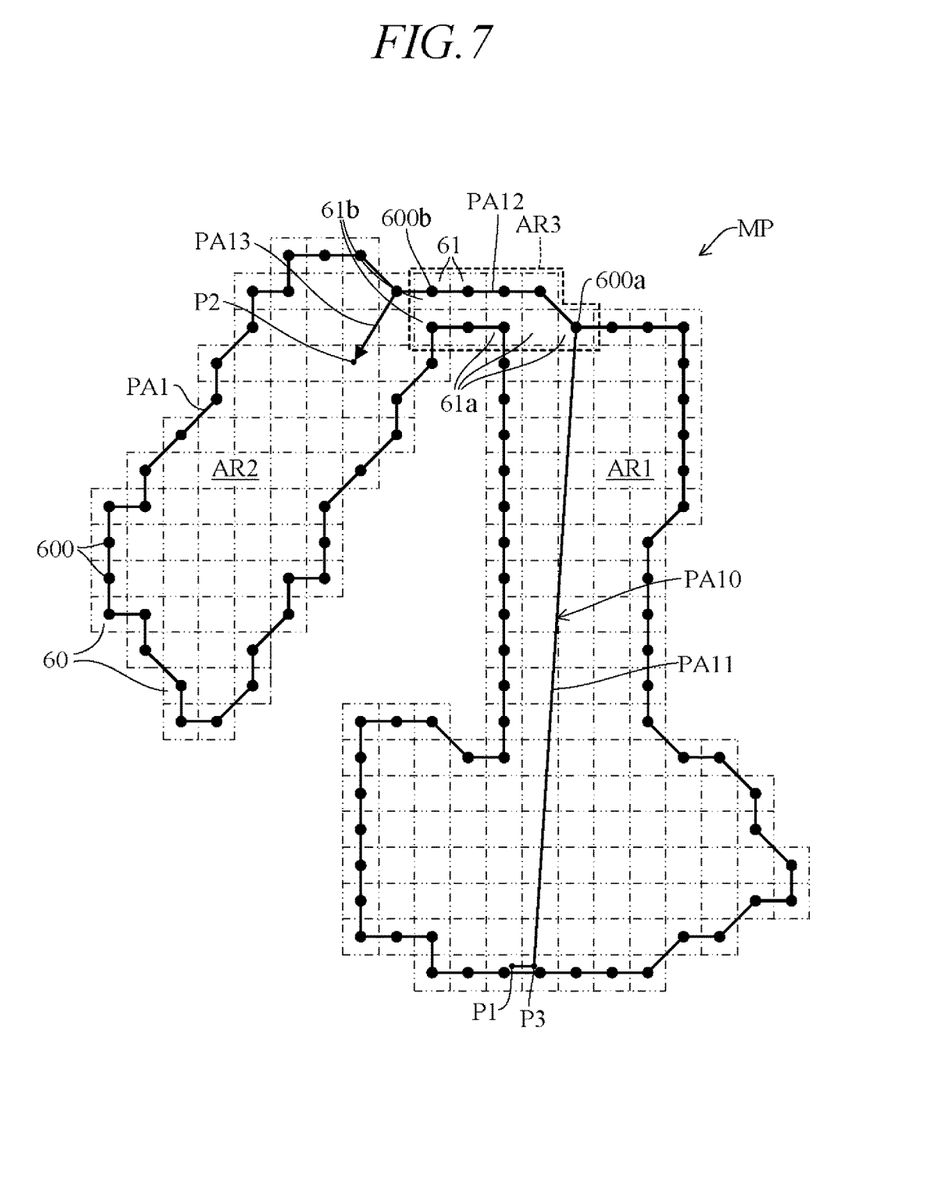
FIG. 7 is a diagram showing an example of a working area map corresponding to the working area of FIG. 4.

FIG. 7 is a diagram showing the working area map MP corresponding to the working area AR of FIG. 4. A segmented route PA1 sequentially connecting center points 600 of boundary cells 60 is shown in the drawing. This segmented route PA1 is of substantially the same shape as, and corresponds to, the boundary line L0 of the working area AR (FIG. 4).

The third area identifying unit 42 calculates position coordinates of the center points 600 of the boundary cells 60 identified by the map generating unit 41 and memorizes these position coordinates in memory as position data of boundary cells 60. In addition, from among boundary cells 60 it identifies third area cells 61 that constitutes the third area AR3 and memorizes identification data of the third area cells 61. Specifically, when one (among cells 6 within a predetermined range in the direction of vehicle 1 advance) whose position data has already been memorized, namely, the cell over which the vehicle 1 passed in trace mode exists, that passed-over cell and the cell where the vehicle 1 is currently situated form the third area cells 61.

Figure 8:
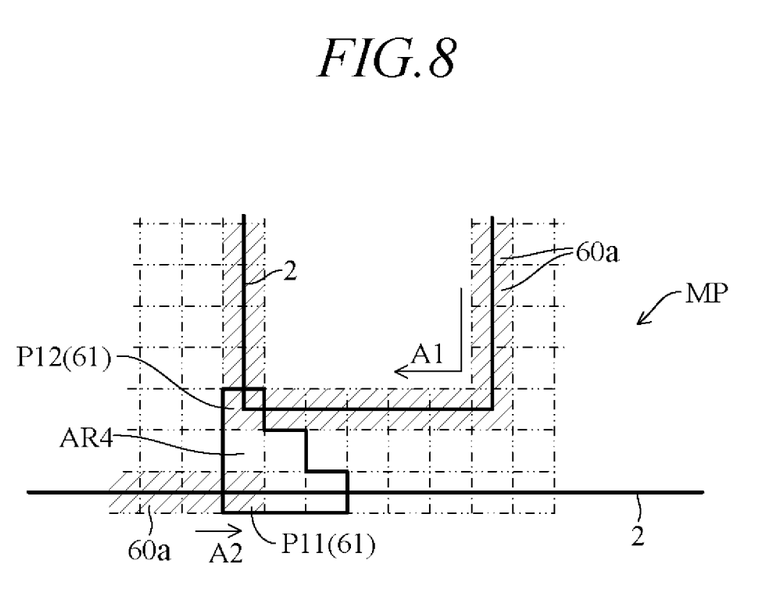
FIG. 8 is a diagram showing an example of third area cells identified by a third cell identifying unit of FIG. 3.

FIG. 8 is a diagram showing an example of the third area cells 61. When the vehicle 1 travels above the boundary wire 2 in the direction of arrow A1 in FIG. 8, position data of any of the boundary cell 60 that the vehicle 1 passed over (that is specially called a passed-over cell 60$a$ and indicated by hatching) is memorized in memory. When the vehicle 1 thereafter travels above the boundary wire 2 in the direction of A2 and its current position becomes position P1 in FIG. 8, the third area identifying unit 42 determines whether the passed-over cell 60$a$ exists within the predetermined range of position P1. The predetermined range, i.e., a search range AR4 is defined based on the direction of vehicle 1 advance.

Figure 9:
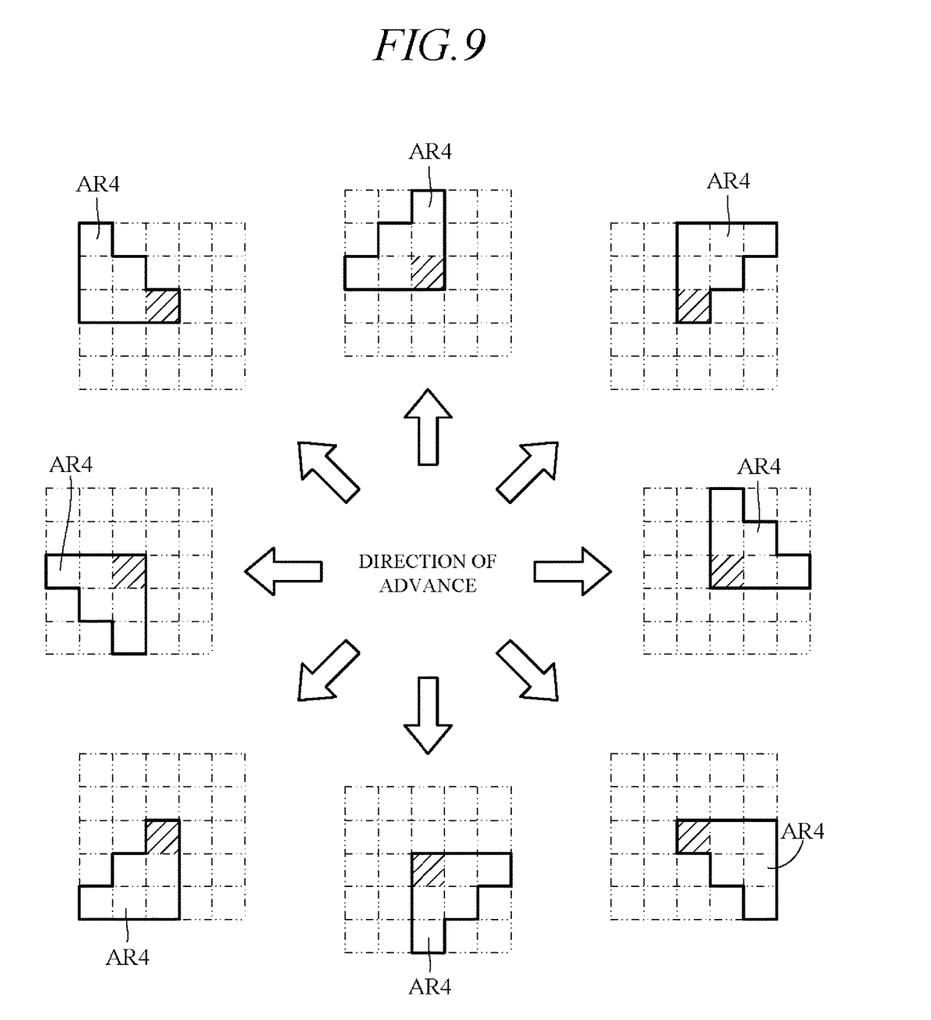
FIG. 9 is a diagram showing a relationship between direction of utility vehicle advance and a search range searched by the ECU of FIG. 3.

FIG. 9 is a diagram showing a relationship between direction of vehicle 1 advance and the search range AR4. In the present embodiment, the vehicle 1 travels counterclockwise so that no passed-over cells 60$a$ are present rightward of direction of advance. Therefore, the search range AR4 is set in, and leftward of, direction of advance. Specifically, as shown in FIG. 9, the search range AR4 is defined as a five-cell cluster in and leftward of direction of advance as viewed from current position of the vehicle 1 (hatched portion).

When the vehicle 1 travels clockwise, the search range AR4 is defined in, and rightward of, direction of advance. In other words, the search range AR4 is defined within the predetermined range in a direction where the working area AR is present as viewed from the vehicle 1.

The predetermined range (search range) AR4 is set taking into account definition of third area AR3 in terms of width of working area AR. For example, when a portion of working area AR having a width of 2 m or less is defined as the third area AR3, the predetermined range is, for example, set at 2 m.

When the search range AR4 is set as shown in FIG. 9, if the vehicle 1 is assumed to be at position P11 as shown in FIG. 8, the passed-over cell 60$a$ is present at position P12 in the search range AR4. Therefore, the third area identifying unit 42 determines the cells 6 at position P11 and position P12 to be the third area cells 61, assigns these cells 6 (i.e., the third area cells 61) identification data for distinguishing them from other of the boundary cells 60, and memorizes the identification data in memory. As a result, cell data memorized in memory for the third area cells 61 include not only position data memorized for the individual boundary cells 60 but also additionally assigned identification data.

The target position setting unit 43 sets a target position for the vehicle 1 to go to. The target position can be manually inputted by the operator through the input unit 25, for example. When the vehicle 1 returns to the charging station 3 in return mode, its final working position before returning can be set as the target position. For example, when the vehicle 1 is operating at position P2 of FIG. 4 and returns to the charging station 3 to charge the battery 20, position P2 amounts to the final working position, and after the battery 20 is charged, this final working position P2 can be set as the target position to be reached via the third area AR3.

The travel controlling unit 44 outputs control commands to the travel motors 18 to control travel activity of the vehicle 1. The first travel controlling unit 441 specifically controls the travel activity of the vehicle 1 in trace mode. Namely, in trace mode, it controls operation of the travel motors 18 based on the magnetic field strengths H detected by the magnetic sensors 51 so that the vehicle 1 travels along the boundary wire 2.

On the other hand, the second travel controlling unit 442 controls the travel activity of the vehicle 1 when the vehicle 1 is required to travel through the third area AR3 in work mode. Namely, when the vehicle 1 is situated in the first area AR1, and the target position in the second area AR2 (goal) has been set by the target position setting unit 43, the second travel controlling unit 442 outputs control commands to the travel motors 18 to control travel activity of the vehicle 1.

In this case, the second travel controlling unit 442 initially sets a first target position at an entrance of the third area AR3 identified by the third area identifying unit 42. Then it detects current position of the vehicle 1 from the output of the position sensor 55 and next drives the vehicle 1 forward toward the first target position while detecting orientation of the vehicle 1 from the output of the orientation sensor 54. The first target position is, for example, set at the center point 600 (600$a$ in FIG. 7) of the third area cell 61 among third area cells 61 adjacent to the first area AR1 that is farthest from the second area AR2.

Next, the second travel controlling unit 442 sets a second target position at an exit of the third area AR3 identified by the third area identifying unit 42. It then drives the vehicle 1 through the third area AR3 toward the second target position based on the outputs of the magnetic sensors 51, for example. The second target position is, for instance, set at the center point 600 (600b in FIG. 7) of the third area cell 61 among third area cells 61 adjacent to the second area AR2 that is on an extension of the segmented route PA1 on which the first target position is set. Therefore, the vehicle 1 travels (trace-mode travels) along and above the boundary wire 2 from the first target position to the second target position.

Lastly, the second travel controlling unit 442 detects position of the vehicle 1 from the output of the position sensor 55 and next drives the vehicle 1 forward toward the final target (goal) position while detecting orientation of the vehicle 1 from the output of the orientation sensor 54. This improves working efficiency by enabling the vehicle 1 to reach the target position via the third area AR3 by the shortest route. When favorable trace-driving from the first target position to the second target position is not possible because center point 600a of the third area cell 61 constituting the first target position and center point 600b of the third area cell 61 constituting the second target position are offset from the boundary line L0 (position of the boundary wire 2), the first target position and the second target position can be set at points of third area cells 61a on the boundary line L0 instead of at the center point 600a and the center point 600b.

Figure 10:
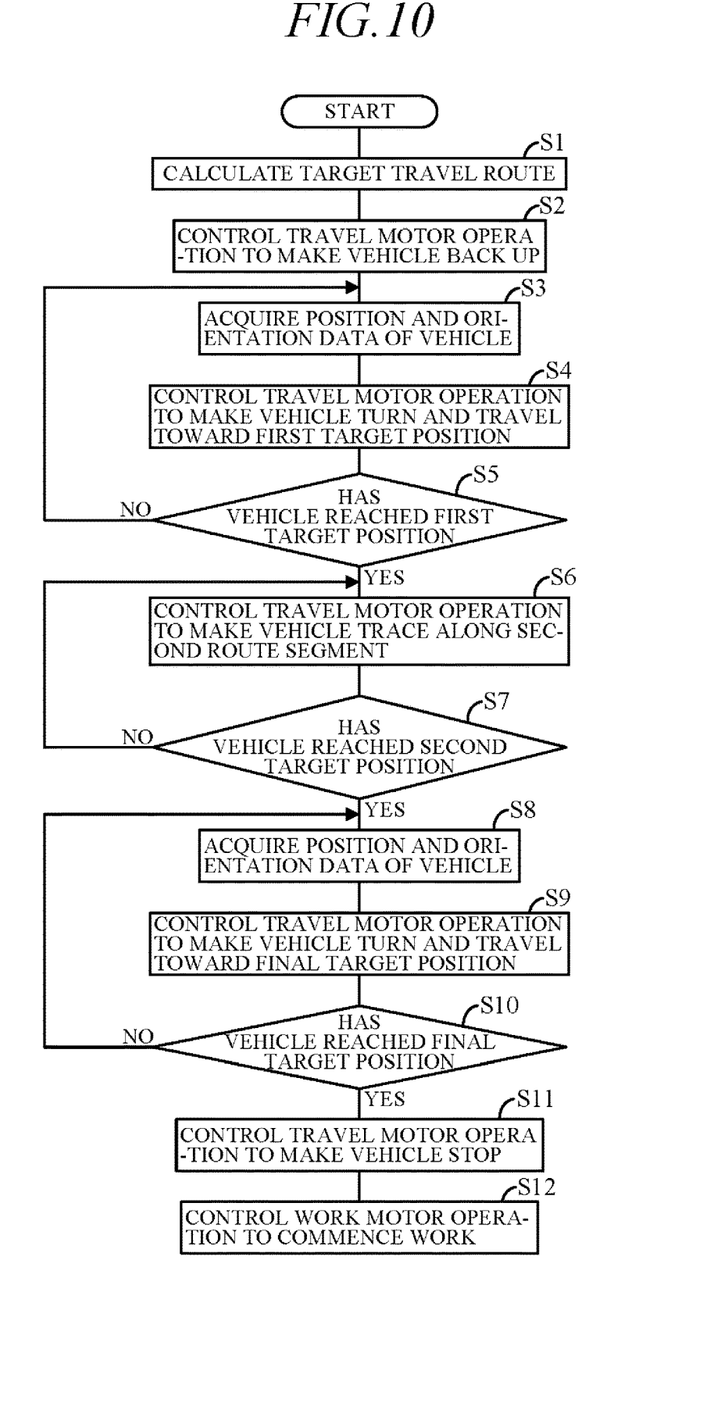
FIG. 10 is a flowchart showing an example of processing executed in the ECU of FIG. 3.

FIG. 10 is a flowchart showing an example of processing executed in the ECU 40, primarily an example of processing executed in the second travel controlling unit 442.

The processing shown in this flowchart is started after completion of travel in trace mode from a state in which the vehicle 1 is connected to the charging station 3 in work mode. Since trace mode travel has been completed, generation of the working area map MP by the map generating unit 41, identification of third area cells 61 and memorization of position data and identification data by the third area identifying unit 42, and setting of a target position by the target position setting unit 43 have been completed. In the example of FIG. 7, the boundary cells 60 inside the area AR3 (dotted line) are defined as third area cells 61. Now follows an explanation of the flowchart of FIG. 10 with reference to FIG. 7.

First, in S1, a target travel route from the current position of the vehicle 1 (e.g., position P1 in FIG. 7) to a target position (e.g., position P2 in FIG. 7) is calculated (S: processing Step). Specifically, ones of cells 6 that are assigned identification data, i.e., the third area cells 61 are first retrieved from among the cells 6 of the working area map MP.

Next, a first target position is set at the center point 600 of one (of the third area cell 61 among the third area cells 61 adjacent to the first area AR1 (third area cells 61a in FIG. 7)) that is farthest from the second area (i.e., the center point 600a in FIG. 7). In addition, a second target position is set at the center point 600 of one (of the third area cell 61 among the third area cells 61 adjacent to the second area AR2 (third area cells 61b in FIG. 7)) that is on an extension of the segmented route PA1 on which the first target position is set (i.e., center point 600b in FIG. 7).

Then a target travel route PA10 is defined in S1 by a first route segment PA11 directly connecting a position of disengagement from the charging station 3 (point P3 in FIG. 7) and the first target position (center point 600a), a second route segment PA12 along the boundary line L0 (boundary wire 2) from the first target position to the second target position (center point 600b), and a third route segment PA13 directly connecting the second target position and final target position P2.

Next, in S2, operation of the travel motors 18 is controlled to make the vehicle 1 back up, i.e., to disengage it from the charging station 3. Next, in S3, the outputs from the position sensor 55 and the orientation sensor 54 are read to acquire position and orientation data of the vehicle 1 (sometimes together called position data). Then, in S4, operation of the travel motors 18 is controlled to make the vehicle 1 turn toward the first target position and thereafter to make the vehicle 1 travel forward along the first route segment PA11.

Next, in S5, it is determined whether the vehicle 1 has reached the first target position based on the outputs of the position sensor 55. Alternatively, whether or not the vehicle 1 has reached the first target position can be determined by detecting whether the vehicle 1 has reached the boundary wire 2 from the outputs of the magnetic sensors 51. When the result in S5 is YES, the program goes to S6, and when NO, returns to S3.

In S6, operation of the travel motors 18 is controlled to make the vehicle 1 trace (travel) along the second route segment PA12 above the boundary wire 2 based on the outputs of the magnetic sensors 51. Next, in S7, it is determined whether the vehicle 1 has reached the second target position based on the outputs of the position sensor 55. When the result in S7 is YES, the program goes to S8, and when NO, returns to S6.

In S8, the outputs of the position sensor 55 and the orientation sensor 54 are read to acquire position and orientation data of the vehicle 1. Next, in S9, operation of the travel motors 18 is controlled to make the vehicle 1 turn toward final target position P2 and thereafter to make the vehicle 1 travel forward along the third route segment PA13.

Next, in S10, it is determined whether the vehicle 1 has reached final target position P2 based on the outputs of the position sensor 55. When the result in S10 is YES, the program goes to S11, and when NO, returns to S8. In S11, operation of the travel motors 18 is controlled to make the vehicle 1 stop. Next, in S12, operation of the work motor 17 is controlled to drive the work unit 16 and commence work at final target position P2. The vehicle 1 thereafter performs its task while traveling randomly in the second area AR2.

As mentioned above, the present embodiment is configured to have an apparatus and method for controlling an operation of an autonomously navigating utility vehicle (1) equipped with a prime mover (18) to travel about a working area (AR) delineated by a boundary wire (2) laid thereat, the working area (AR) being divided into at least a first area (AR1) and a second area (AR2) connected by a third area (AR3) that is narrower than the first and second areas, a magnetic sensor (40) installed on the vehicle (1) to produce an output indicating a magnetic field (H) generated by electric current passing through the boundary wire (2); a position sensor (55) that produces an output indicating a position of the vehicle (1); characterized by: an electronic control unit (ECU) 40 having a CPU and a memory, wherein the CPU is configured to function as a first travel controlling unit (40, 441) that controls an operation of the prime mover (18) to make the vehicle (1) travel along the boundary wire (2) in trace mode to determine the working area (AR) based on the magnetic field (H) detected from the output of the magnetic sensor; a map generating unit (40, 41) that generates a map (MP) of the working area (AR) by determining the position of the vehicle (1) on a map comprised of an array of multiple cells (6) detected from the output of the position sensor when the vehicle (1) is controlled to travel by the first travel controlling unit; and a target position setting unit (40, 43) that sets a target position (P2) of the vehicle (1) in the second area (AR2); a third area identifying unit (40, 42) that identifies a location of the third area (AR3) in the working area (AR) based on the position of the vehicle (1)

on the map generated by the map generating unit detected from the output of the position sensor when the vehicle (1) is controlled to travel by the first travel controlling unit; and a second travel controlling unit (40, 442, S1-S12 S6 S11) that controls the operation of the prime mover (18) in work mode to make the vehicle (1) travel forward toward an entrance of the third area (AR3) whose location is identified by the third area identifying unit based on the position of the vehicle (1) detected from the output of the position sensor.

With this, by identifying location of the third area AR3 based on the position of the vehicle 1 (e.g., in trace mode) and driving the vehicle 1 forward toward an entrance of the third area AR3 (e.g., in work mode) in this manner, it is possible to move the vehicle 1 to the entrance of the third area AR3 by the shortest path. Working efficiency therefore increases because the vehicle 1 can be quickly moved from the current position (e.g., P1) in the first area AR1 to the target position (e.g., P2) in the second area AR2.

The apparatus and method further includes: wherein the third area identifying unit memorizes position data of one or ones of the cells (60) of the map (MP) over which the vehicle (1) passes and identifies the location of the third area (AR3) based on the memorized position data of the one or ones of the cells (60) within a predetermined range of the travel of the vehicle (1).

With this, in addition to the advantages and effects mentioned above, identification of the third area cells 61 by using the area map MP to determine whether the passed-over cell(s) 60*a* exists within the predetermined range in this manner simplifies identification of the third area AR3. Moreover, since it suffices to memorize data (position data, identification data) of the third area cells 61 in association with the cells 6, memory capacity can be saved, third area cell 61 search time can be shortened, and target travel route computation can be accelerated.

In the apparatus and method, the second travel controlling unit controls the operation of the prime mover (18) to make the vehicle (1) travel along the boundary wire (2) from the entrance to an exit of the third area (AR3) whose location is identified by the third area identifying unit based on the position of the vehicle (1) on the map detected from the output of the position sensor and the magnetic field (H) detected from the output of the magnetic sensor. This enables the vehicle 1 to pass through the third area AR3 without fail.

The apparatus and method wherein the second travel controlling unit controls the operation of the prime mover (18) to make the vehicle (1) travel forward from the exit of the third area (AR3) to the target position (P2) set by the target position setting unit based on the position of the vehicle (1) on the map detected from the output of the position sensor.

With this, in addition to the advantages and effects mentioned above, the vehicle 1 can be moved to the target position by the shortest route, so that prompt performance of work in an adjacent area connected by the third area AR3 is made possible.

In the apparatus and method, the target position setting unit sets a target position at a center point (600*a*) of a cell (60) among the one or ones of the cells (60) adjacent to the first area (AR1), but is farthest from the second area (AR2).

With this, in addition to the advantages and effects mentioned above, the first route segment PA11 from the current position P1 to the first target position does not intersect the boundary wire 2 and the vehicle 1 can travel forward along the first route segment PA11 in the first area AR1.

In the apparatus and method, the map generating unit generates the map (MP) of the working area (AR) by memorizing position data of each of the cells (60) over which the vehicle (1) passes when the vehicle (1) is controlled to travel by the first travel controlling unit.

With this, in addition to the advantages and effects mentioned above, the working area map (MP) can be generated easily and accurately.

In the above, although the first target position is set at the center point 600*a* of the third area cell 61*a* that is farthest from the second area AR2, the third area cell 61*a* at the entrance of the third area AR3 (at which the first target position is set) should preferably be determined with consideration to the shape of the working area map MP.

In other words, it is also possible to set the first target position at the center point 600*a* of the third area cell 61*a* that is closest to the second area AR2. In a case where the first route segment PA11 and the boundary line L0 intersect, an intermediate target position can be separately set inside the first area AR1 near the intersection and the vehicle 1 be driven from the current position P1 to the first target position via the intermediate target position.

In the above, it is also possible to identify the cells 60 based on the outputs from the angular velocity sensor 52 and wheel speed sensors 57 rather than the position data acquired from the outputs of the position sensor 55. In that case, a turning angle $\Delta\theta$ of the vehicle 1 relative to a reference line (e.g., X-axis) is first detected at every predetermined time interval $\Delta t$ (e.g., 100 ms) based on the outputs from the angular velocity sensor 52. In addition, a travel distance $\Delta L$ traveled by the vehicle 1 during predetermined time interval $\Delta t$ is detected based on outputs from the wheel speed sensors 57.

Next, the detected turning angle $\Delta\theta$ and travel distance $\Delta L$ are used in the equation (I) below to calculate the XY-plane position coordinates (X, Y) of moving point P of the vehicle 1 relative to a reference position (e.g., position of the charging station 3) at every predetermined time interval $\Delta t$.

$$X=\Delta L \times \cos \Delta\theta, Y=\Delta L \times \sin \Delta\theta \tag{1}$$

As shown in FIG. 6, the travel locus PA0 along the boundary wire 2 is obtained by sequentially connecting the calculated moving points P by straight lines. Cells 60 (hatched areas) containing this travel locus PA0 constitute boundary cells 60.

In the above, although the present embodiment is configured such that a pair of magnetic sensors 51L, 51R are installed, the sensor 51 may be a single one.

In the above, the arrangement of the working area AR and location of the charging station 3 as well as the configuration of the working area map MP should not be limited to those mentioned in the embodiment. For example, the charging station 3 may be located in the second working area AR2.

Further, although it is configured such that the map generating unit 41 generates the working area map MP of the working area AR comprised of an array of a plurality of cells 6, the configuration the cells 6 should not limited to those mentioned in the embodiment.

Although the present embodiment is configured such that the vehicle 1 is driven by the prime mover comprising a pair of travel motors 18L, 18R, it may be configured such that the vehicle 1 can be driven by other prime mover such as an internal combustion engine.

It should be noted in the above that, although the present embodiment is applied for a lawn mower for lawn or grass mowing work, it may applied to any other type of utility vehicle.

While the present invention has been described with reference to the preferred embodiments thereof, it will be understood, by those skilled in the art, that various changes and modifications may be made thereto without departing from the scope of the appended claims.

What is claimed is:

1. An apparatus for controlling an operation of an autonomously navigating utility vehicle equipped with a prime mover to travel about a working area delineated by a boundary wire laid thereat, the working area being divided into at least a first area and a second area connected by a third area that is narrower than the first and second areas, the apparatus comprising:

a magnetic sensor installed on the autonomously navigating utility vehicle to produce output indicating a magnetic field generated by an electric current passing through the boundary wire;

a position sensor that produces output indicating a position of the autonomously navigating utility vehicle; and an electronic control unit having a CPU and a memory, the CPU controls the autonomously navigating utility vehicle to circuit along the boundary wire in trace mode based on the output from the magnetic sensor, and generates a map of the working area comprised of an array of cells based on the output from the position sensor;

the CPU, in generating the map, identifies boundary cells of the cells in the array passed over by the autonomously navigating utility vehicle during the trace mode, and identifies third area cells of the boundary cells that are located in the third area based the third area cells being within a predetermined range from other ones of the boundary cells;

the CPU identifies the autonomously navigating utility vehicle positioned in the first area, identifies a final target position for the autonomously navigating utility vehicle in the second area, sets a first target position at a first one of the third area cells at an entrance of the third area that is adjacent to the first area and farthest from the second area, outputs control signals which cause the prime mover to drive the autonomously navigating utility vehicle through the first area toward the first target position, sets a second target position at a second one of the third area cells at an exit of the third area, outputs the control signals which cause the prime mover to drive the autonomously navigating utility vehicle through the third area toward the second target position, and outputs the control signals which cause the prime mover to drive the autonomously navigating utility vehicle through the second area to the final target position.

2. The apparatus of claim 1, wherein:

the CPU outputs the control signals which cause the prime mover to drive the autonomously navigating utility vehicle through the third area toward the second target position along the boundary wire based on the output from the magnetic sensor.

3. A method for controlling an operation of an autonomously navigating utility vehicle equipped with a prime mover to travel about a working area delineated by a boundary wire laid thereat, the working area being divided into at least a first area and a second area connected by a third area that is narrower than the first and second areas, the method comprising the steps of:

controlling the autonomously navigating utility vehicle to circuit along the boundary wire in trace mode based on output from a magnetic sensor that detects a magnetic field strength generated by electric current passing through the boundary wire;

generating, at an Electronic Control Unit (ECU), a map of the working area comprised of an array of cells based on output from a position sensor;

wherein generating the map comprises:

identifying boundary cells of the cells in the array passed over by the autonomously navigating utility vehicle during the trace mode; and identifying third area cells of the boundary cells that are located in the third area based the third area cells being within a predetermined range from other ones of the boundary cells;

identifying, at the ECU, the autonomously navigating utility vehicle positioned in the first area;

identifying, at the ECU, a final target position for the autonomously navigating utility vehicle in the second area;

setting, at the ECU, a first target position at a first one of the third area cells at an entrance of the third area that is adjacent to the first area and farthest from the second area;

outputting, at the ECU, control signals which cause the prime mover to drive the autonomously navigating utility vehicle through the first area toward the first target position;

setting, at the ECU, a second target position at a second one of the third area cells at an exit of the third area;

outputting, at the ECU, the control signals which cause the prime mover to drive the autonomously navigating utility vehicle through the third area toward the second target position; and outputting, at the ECU, the control signals which cause the prime mover to drive the autonomously navigating utility vehicle through the second area to the final target position.

4. The method of claim 3, wherein outputting the control signals which cause the prime mover to drive the autonomously navigating utility vehicle through the third area comprises:

outputting the control signals which cause the prime mover to drive the autonomously navigating utility vehicle through the third area toward the second target position along the boundary wire based on the output from the magnetic sensor.

5. An apparatus for controlling an operation of an autonomously navigating utility vehicle equipped with a prime mover to travel about a working area delineated by a boundary wire laid thereat, the working area being divided into at least a first area and a second area connected by a third area that is narrower than the first and second areas, the apparatus comprising:

a magnetic sensor installed on the autonomously navigating utility vehicle to produce output indicating a magnetic field generated by an electric current passing through the boundary wire;

a position sensor that produces output indicating a position of the autonomously navigating utility vehicle; and an electronic control unit having a CPU and a memory, the CPU controls the autonomously navigating utility vehicle to circuit along the boundary wire in trace mode based on the output from the magnetic sensor, and generates a map of the working area comprised of an array of cells based on the output from the position sensor;

the CPU, in generating the map, calculates a travel locus of the autonomously navigating utility vehicle on the map based on the output from the position sensor indicating a position of the autonomously navigating utility vehicle from start to finish of the trace mode, and identifies boundary cells from the cells of the array passed over by the autonomously navigating utility vehicle based on the travel locus;

as the autonomously navigating utility vehicle advances along the travel locus from start to finish over the boundary cells, the CPU determines whether a boundary cell is within a predetermined range of another boundary cell based on a direction of advance of the autonomously navigating utility vehicle along the travel locus, and stores data in the memory indicating the boundary cell as a third area cell that is part of the third area when the boundary cell is within the predetermined range of another boundary cell;

the CPU identifies the autonomously navigating utility vehicle positioned in the first area, identifies a final target position for the autonomously navigating utility vehicle in the second area, sets a first target position at a first one of the third area cells at an entrance of the third area that is adjacent to the first area and farthest from the second area, outputs control signals which cause the prime mover to drive the autonomously navigating utility vehicle through the first area toward the first target position, sets a second target position at a second one of the third area cells at an exit of the third area, outputs the control signals which cause the prime mover to drive the autonomously navigating utility vehicle through the third area toward the second target position, and outputs the control signals which cause the prime mover to drive the autonomously navigating utility vehicle through the second area to the final target position.

6. The apparatus of claim 5, wherein:
the CPU outputs the control signals which cause the prime mover to drive the autonomously navigating utility vehicle through the third area toward the second target position along the boundary wire based on the output from the magnetic sensor.

* * * * *